Aug. 8, 1939.   R. W. HALL ET AL   2,169,097
DYNAMO-ELECTRIC MACHINE
Filed Sept. 1, 1938
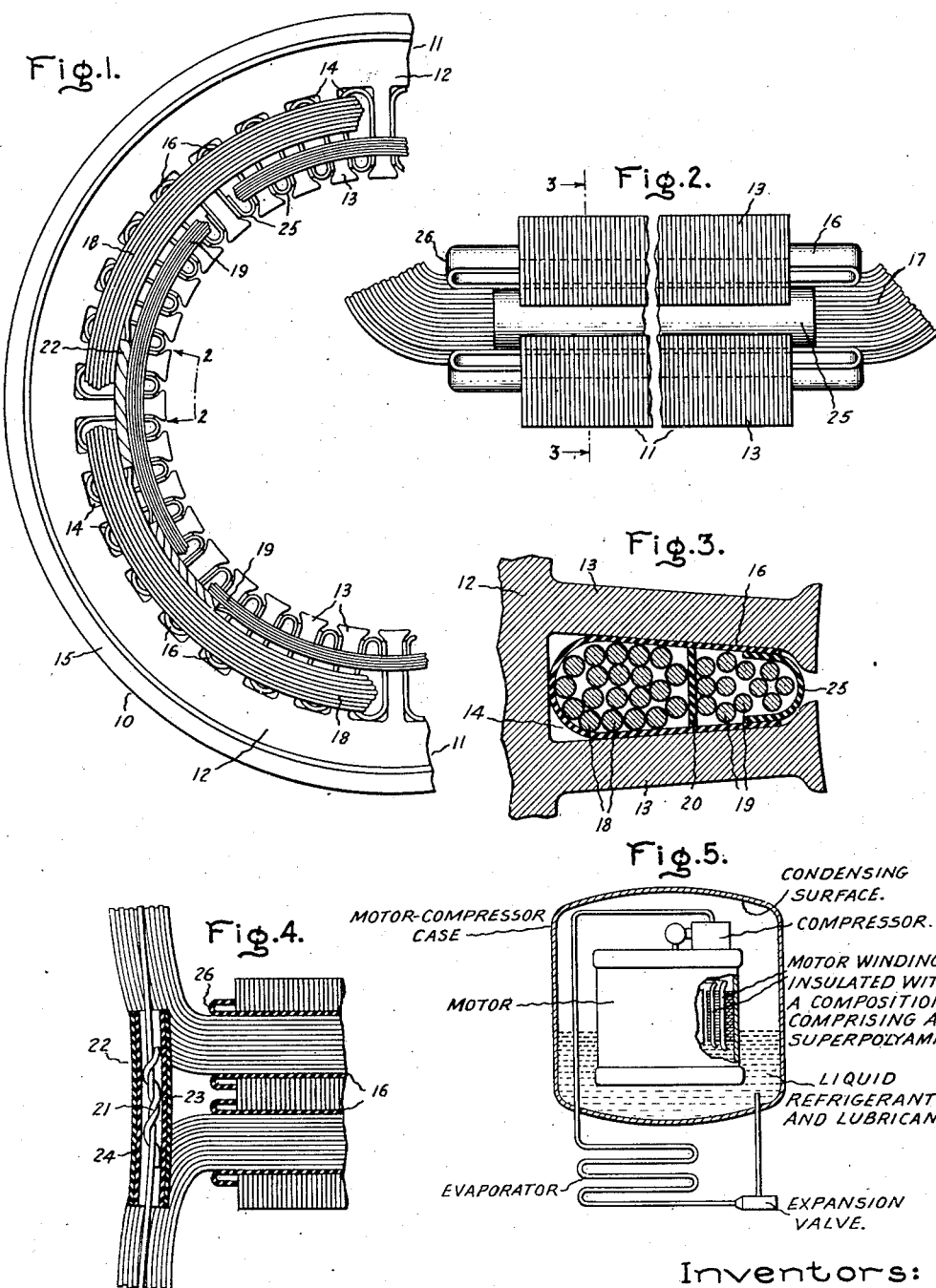
Inventors:
Ralph W. Hall,
Henry A. Smith,
by Harry E. Dunham
Their Attorney.

Patented Aug. 8, 1939

2,169,097

UNITED STATES PATENT OFFICE 2,169,097

DYNAMO-ELECTRIC MACHINE

Ralph W. Hall and Henry A. Smith, Fort Wayne, Ind., assignors to General Electric Company, a corporation of New York Application September 1, 1938, Serial No. 227,952

8 Claims. (Cl. 171—252)

The present invention relates to dynamo-electric machines, and more particularly is concerned with certain improvements and modifications in the insulation of such machines.

In the construction of certain types of dynamo-electric machines, as for example hermetically sealed refrigerator motors wherein both the refrigerant and the lubricant employed in the refrigeration system come in contact with the motor, it has heretofore been common practice to insulate the windings of such motors with cotton, paper or the like. Such materials have the objectionable characteristic of both adsorbing and absorbing moisture. The use of these materials has necessitated extensive drying of the motor to remove water from the insulation. Such drying operation has been expensive and time-consuming and, despite the utmost care, did not result in 100 per cent removal of water, since the use of a temperature sufficiently high to remove all water would damage the insulation. The water that remained in the insulation had a detrimental effect upon the refrigeration system. For example, with a refrigerant such as sulfur dioxide this water would combine therewith to form sulfurous acid, which attacked the insulation and also corroded the working metal parts with which it came in contact. In the case of refrigerants such as dichlordifluormethane, with which water does not chemically or physically combine to any substantial extent, the water evolved from the insulation collected in the system in a free state and caused operating difficulties. Fatty acids, waxes and soluble carbohydrates present in cotton insulation also have been a source of trouble, for if not removed by expensive solvent washing processes, they were dissolved out of the cotton by the refrigerant and lubricant, and also caused trouble in the effective operation of the system.

We have discovered that a new synthetic material which is now available, and which will be identified more fully hereafter, is unattacked by ordinary refrigerants such, for example, as sulfur dioxide and dichlordifluormethane, is insoluble in lubricating oils, and is free from the above-mentioned characteristics which make cotton undesirable as a refrigerator motor winding insulation. The new synthetic material also has a high dielectric strength, as well as other valuable properties which will be described later herein. We have further discovered that these properties of the material make it especially adapted for use in insulating windings and other parts of motors, specifically hermetically sealed refrigerator motors. Tests on motors wherein the new synthetic insulating material was utilized indicate satisfactory service life.

The novel features of our invention are set forth in the appended claims. The invention itself, however, will be understood most readily from the following detailed description when considered in connection with the accompanying drawing, which is representative of one embodiment of the invention, and in which—

Fig. 1 is an end view of a portion of a member, specifically a stator, of a dynamo-electric machine embodying our invention;

Fig. 2 is an enlarged, elevational fragmentary view of a stator slot taken on the line 2—2 of Fig. 1;

Fig. 3 is an enlarged sectional view taken on the lines 3—3 of Fig. 2;

Fig. 4 is an enlarged elevational view, partly in section, of two adjoining insulated slots with coil sides or windings therein; and Fig. 5 is a view showing somewhat diagrammatically a refrigeration system to which our invention may be applied, a part of the motor of the sealed motor-compressor unit being broken away to show more clearly the windings thereof.

The synthetic material which is used in carrying the present invention into effect is a non-cellulosic material and is a member of the class of materials known, generally, as synthetic linear condensation superpolyamides. Such superpolyamides are described, for example, in British Patents 461,236 and 461,237.

As stated in British Patent 461,236, superpolyamides can be obtained by suitable heat treatment of one or more monoaminomonocarboxylic acids having amino and carboxylic acid radicals attached to the carbon atoms that are most remote from each other and contain no substituent groups other than hydrocarbon radicals. Superpolyamides also can be prepared by suitably heating esters of such monoaminomonocarboxylic acids, or low molecular weight polyamides obtainable from said acids or their esters, or mixtures of the foregoing substances. As pointed out in British Patent 461,237 superpolyamides also are derived from the reaction of diamines of the formula $NH_2CH_2RCH_2NH_2$ and dicarboxylic acids (and their amide-forming derivatives) of the formula $HOOCCH_2R'CH_2COOH$ in which R and R' are divalent hydrocarbon radicals and in which R has a chain length of at least two carbon atoms. Within this class the most desirable superpolyamides in carrying the present invention into effect are prepared from diamines of the formula $NH_2(CH_2)_xNH_2$ and dicarboxylic acids of the formula $HOOC(CH_2)_yCOOH$ in which $x$ is at least 4 and $y$ at least 3. A preferred superpolyamide is a reaction product of hexamethylene diamine and adipic acid. Superpolyamides produced in accordance with either of the above British patents are capable of being drawn or spun into continuous filaments. These filaments may be made in the form of threads or yarns of varying thicknesses, or into felted or woven sheets, tapes or the like. These superpolyamides also may be converted into smooth-surfaced continuous sheets, tapes, etc.

The term "superpolyamide" as used generally herein is intended to include within its meaning the products described briefly above and more fully in, for example, the aforesaid British patents.

Referring to Fig. 1 of the drawing, the portion of a dynamo-electric machine there shown for purpose of illustrating the invention comprises a stationary element or stator 10 having a magnetic core 11, which is indicated in Fig. 2 as being made of laminations but which may be in any other suitable form. The core 11 consists of a main or yoke portion 12 having teeth 13 extending therefrom to form a plurality of coil-retaining slots 14. A ring 15 forms a frame for supporting the core. The edges of this ring may be turned inwardly so as to form abutments between which the core is supported as more fully described in, for example, Kayser Patent No. 1,812,748, issued June 30, 1931.

The slots 14 are provided with a liner 16 formed of a suitable insulating material, advantageously a material comprising a superpolyamide. For example, the liner 16 may be formed solely of sheet superpolyamide or of superpolyamide in combination with other insulating materials. Thus a strong, tough slot liner may be formed by suitably combining, as by laminating, sheet fibrous material such as paper, asbestos, spun glass, mineral wool, etc., and sheet superpolyamide. The sheet fibrous material may be faced, as desired or as conditions may require, with a coextensive, adhering, smooth-surfaced sheet of superpolyamide. In some cases it may be desirable to form the slot liner from sheet fibrous material coated and impregnated with a superpolyamide in solution state and thereafter heated to evaporate the solvent and to harden the superpolyamide.

The insulated conductors 17 (Fig. 2) are wound in the lined slots 14. It is an essential feature of the present invention that the insulation on the conductors 17 comprise a superpolyamide, preferably a superpolyamide obtained by reacting hexamethylene diamine with adipic acid as described, for instance, under Example 2 of British Patent 461,237. The conductor may be insulated with this material in the form of a wrapping of superpolyamide in thread, yarn, tape or similar form. Preferably, however, the conductor is insulated with a smooth-surfaced, continuous, tightly adhering film of superpolyamide. Such an insulating film may be obtained by applying a solution of a superpolyamide to the wire, for example, with conventional wire-enameling apparatus, and thereafter heating the thus coated wire to evaporate the solvent and to leave a continuous coating of solid superpolyamide. Or, if desired, such a film may be produced on the wire as described in the co-pending application of Henry A. Smith, Serial No. 227,980, filed concurrently herewith and assigned to the same assignee as the present invention. In accordance with the method disclosed and claimed in this Smith application a wrapping (a covering having an interrupted or discontinuous surface as distinguished from a smooth, continuous surface) of superpolyamide is applied to the conductor to be insulated, after which the wrapping is heated in place to form a continuous coating thereon, and the coating then hardened as by cooling. By either method a hard, tough, flexible, tightly adhering, abrasion-resistant insulating film is obtained. Such a film also has a high dielectric strength, being of the order of 1000 to 1400 volts per mil, and materially above that of the same superpolyamide when in thread, yarn, fabric or similar form.

In the embodiment of the invention shown in the drawing the slots are shown as containing superposed layers of turns or sides of insulated motor-running conductor windings 18 and over that layer a second layer of insulated motor-starting conductor windings 19 with a separator 20 therebetween. Either or both these layers of windings are insulated with superpolyamide in the form of a wrapping or as a continuous, adhering, smooth-surfaced film. For example, the motor-starting windings may be insulated with a wrapping of superpolyamide yarn and the motor-running windings with a continuous film of superpolyamide.

The separator may be formed of any suitable material, but advantageously is made of a material comprising a superpolyamide as described above with reference to the liner 16. The liner 16 and the separator 20 advantageously may be formed of the same material.

In Fig. 4 is shown a connection or union 21 formed by brazing, twisting together or otherwise uniting the coil ends, over which connection is placed in the sleeving 22. This sleeving may be formed of any suitable insulating material. Advantageously it is formed solely of a superpolyamide or, as shown in the drawing, of an inner layer 23 formed, for example, of cotton cloth, paper, etc., and a thin outer coating or wrapping 24 of a superpolyamide.

The insulated conductor windings are retained in the slots 14 with wedges 25. If desired the wedges 25 and the slot liners 16 may extend, as shown in Fig. 2, beyond the ends of the slots. In this way the possibility of damaging the insulated conductors during the winding operation is minimized. The wedges 25 may be formed of any suitable material as, for example, hard fibre or a composition comprising a superpolyamide.

To increase the edge tear strength of the slot liners 16, they may be folded over at their edges as shown at 26 (Figs. 2 and 4). Or, if desired, end insulation formed of suitable material, such as hard fibre or a composition comprising a superpolyamide, may be used.

Instead of using a straight or pure superpolyamide wherever the same has been mentioned herein we may use in certain cases a modified superpolyamide, for example a superpolyamide having incorporated therewith a compatible potentially reactive (heat-hardenable) resin, such for instance as a compatible phenol-aldehyde resin. Compositions comprising such modified superpolyamides and conductors insulated with the same, including method features, are disclosed and claimed in the copending application of Henry A. Smith and Edward H. Jackson, Serial No. 227,981, filed concurrently herewith and assigned to the same assignee as the present invention, the matter claimed therein being separate and distinct from that which is claimed by us in the instant case. In some cases both the motor windings may be insulated with, and other insulating structures of the motor may be composed of, suitable combinations of fibrous inorganic materials (for example, asbestos, mineral wool, spun glass, etc.) and modified or unmodified superpolyamide. Such combinations and conductors insulated with the same are disclosed and claimed in our copending application Serial No. 227,894, filed concurrently herewith and assigned to the same assignee as the present invention. As therein set forth, the combinations of fibrous inorganic material and superpolyamide may comprise juxtaposed layers of the said materials, which may be, for example, in thread, yarn, tape or fabric form, or, in certain cases, in smooth-surfaced continuous sheet form, as well as in other forms. Or, the fibrous inorganic material may be coated and impregnated with a superpolyamide. Also, a staple yarn may be formed by incorporating staple superpolyamide with staple asbestos, spun glass or the like, or threads or yarns may be made by twisting together filaments of inorganic insulating material with filaments of superpolyamide. Or, cloth may be made by weaving together threads of inorganic material with threads of superpolyamide. These various combinations of inorganic insulating material and superpolyamide, to which our aforesaid copending application more particularly is directed, constitute electrical insulation which may be used as insulating elements of the dynamo-electric machines produced in accordance with the present invention. The matter which is claimed by us in our aforesaid copending application is separate and distinct from that which we claim in the instant case.

Motors insulated in accordance with the present invention are economical to construct and are efficient in operation. They have been used, for example, in refrigerating systems such as shown by way of illustration in Fig. 5, employing as refrigerants in one case sulfur dioxide and in another, dichlordifluormethane, without any of the difficulties which may be encountered when using cotton-covered motor windings. Our invention therefore provides an efficient refrigeration system in which a sealed motor-compressor unit has an electric motor in contact with the circulating agents of the system and wherein the windings of said motor are insulated with a composition comprising a superpolyamide. It will be understood, of course, that motors other than refrigerator motors can be constructed in accordance with the present invention.

What we claim as new and desire to secure by Letters Patent of the United States is:

1. A dynamo-electric machine having a member comprising a magnetic core and windings of an electrical conductor about said core, said conductor being insulated with a composition comprising a superpolyamide.

2. A motor having a member comprising a magnetic core, coil windings about said core, and insulation on said windings comprising a superpolyamide obtained by reacting hexamethylene diamine with adipic acid.

3. A refrigerator motor having a stationary member comprising a core provided with a plurality of slots, a liner for each of said slots formed of a composition comprising a superpolyamide, and windings of an electrical conductor within the lined slots, said conductor being insulated with a composition comprising a superpolyamide.

4. A dynamo-electric machine having a member comprising a core provided with a plurality of slots, a liner in each of said slots, a plurality of connected coils within the lined slots, said coils consisting of conductors covered with insulation comprising a superpolyamide, a flexible sleeving over the connections between the said coils, said sleeving being formed of a composition comprising a superpolyamide.

5. A motor having a stationary member comprising a core provided with a plurality of slots, a liner in each of said slots, superposed layers of sides of different coils within each of the lined slots, said coils consisting of conductors covered with insulation comprising a superpolyamide, and a separator of insulating material comprising a superpolyamide between the said superposed layers of different coil sides.

6. A refrigerator motor having a stationary member comprising a core provided with a plurality of slots, a liner in each of said slots, superposed layers of sides of motor-running and motor-starting coils within the lined slots, said coils consisting of conductors covered with insulation comprising a superpolyamide, a separator between the said layers of coil sides, a wedge adapted to retain the said coil sides within each of said slots, a flexible sleeving over the connections between the said coils, said liner, separator and sleeving being formed of an insulating material comprising a superpolyamide.

7. A refrigerator motor adapted to operate in contact with a refrigerant of the type represented by sulfur dioxide and dichlordifluormethane, which motor is insulated in its windings with insulation resistant to said refrigerants, said insulation comprising a superpolyamide.

8. A refrigerator motor adapted to operate in contact with a refrigerant of the type represented by sulfur dioxide and dichlordifluormethane and having the windings thereof insulated with a non-cellulosic insulating material comprising a superpolyamide resistant to said refrigerants.

RALPH W. HALL.
HENRY A. SMITH.

DISCLAIMER 2,169,097.—*Ralph W. Hall* and *Henry A. Smith*, Fort Wayne, Ind. DYNAMO-ELECTRIC MACHINE. Patent dated August 8, 1939. Disclaimer filed April 27, 1940, by the assignee, *General Electric Company*.

Hereby enters this disclaimer to claims 1 and 2 of said Letters Patent.

[*Official Gazette May 21, 1940.*]

CERTIFICATE OF CORRECTION.

Patent No. 2,169,097.                                           August 8, 1939.

RALPH W. HALL, ET AL.

It is hereby certified that error appears in the printed specification of the above numbered patent requiring correction as follows: Page 2, second column, line 40, strike out the word "in"; page 3, second column, line 23, claim 4, for "betwen" read between; and that the said Letters Patent should be read with this correction therein that the same may conform to the record of the case in the Patent Office.

Signed and sealed this 3rd day of October, A. D. 1939.

(Seal)
Henry Van Arsdale,
Acting Commissioner of Patents.

DISCLAIMER 2,169,097.—*Ralph W. Hall* and *Henry A. Smith*, Fort Wayne, Ind. DYNAMO-ELECTRIC MACHINE. Patent dated August 8, 1939. Disclaimer filed April 27, 1940, by the assignee, *General Electric Company*.

Hereby enters this disclaimer to claims 1 and 2 of said Letters Patent.

[*Official Gazette May 21, 1940.*]

DISCLAIMER 2,169,097.—*Ralph W. Hall* and *Henry A. Smith*, Fort Wayne, Ind. DYNAMO-ELECTRIC MACHINE. Patent dated August 8, 1939. Disclaimer filed February 12, 1941, by the assignee, *General Electric Company*.

Hereby enters this disclaimer to claim 3 of said Letters Patent.

[*Official Gazette March 18, 1941.*]